United States Patent [19]
Nemtsov et al.

[11] 3,858,413
[45] Jan. 7, 1975

[54] UNIVERSAL JOINT

[76] Inventors: Jury Mitrofanovich Nemtsov, Trekhprudny pereulok, 5/15, kv. 21; Alexandr Galikovich Klimov, Ryazansky prospekt, 91, korpus 1, kv. 168; Ivan Ignatievich Grishin, Volzhsky bulvar, 12, korpus 2, kv. 11, all of Moscow, U.S.S.R.

[22] Filed: May 2, 1973

[21] Appl. No.: 356,595

[52] U.S. Cl. .................................. 64/17 A
[51] Int. Cl. ............................... F16d 3/26
[58] Field of Search .......... 64/17 SP, 17 A, 17 R; 308/107 R; 180/46, 47

[56]        References Cited
         UNITED STATES PATENTS
1,483,560   2/1924   Thiencer ........................ 64/17 R
2,209,855   7/1940   Slaght ............................ 64/17 A
2,439,569   4/1948   Hathorn .......................... 64/17 A
3,353,374  11/1967   Buthenhoff ...................... 64/17 A

*Primary Examiner*—Samuel Scott
*Assistant Examiner*—Randall Heald
*Attorney, Agent, or Firm*—Waters, Roditi, Schwartz & Nissen

[57]  ABSTRACT

A universal joint has two forks and a cross the trunnions of which mount needle roller bearings secured in the forks.

The cross trunnions are provided with through axial passages which communicate with a hole formed centrally in the cross and accomodating a relief valve.

The relief valve is essentially a cylindrical stem made of a resilient oil-resistant material and having an interference fit in the cross central hole. It seals off the whole universal joint and each individual bearing.

2 Claims, 4 Drawing Figures

Patented Jan. 7, 1975

UNIVERSAL JOINT

This invention relates to machine elements, more particularly to a universal joint transmitting rotational motion between shafts connected at an angle, and can be used with particular advantage in the universally jointed drives of automobiles and tractors.

Well known are universal joints comprising a driven and a driving fork fitted on diametrically opposite centre cross trunnions and adapted to turn round them through some angle by provision of bearings; for example needle roller bearings, installed in the fork jaws and running on the cross trunnions.

The trunnions of the cross are provided with through axial lubrication passages which communicate with a hole formed in the universal-joint cross centrally and square to said trunnion passages.

To let out air and excess lubricant from the bearings and lubrication passages in the cross trunnions, the universal joints under consideration are equipped with a relief valve fitted in the cross central hole.

The relief valve shut-off members are known to be made in the form of spring-loaded balls or stems with variously shaped heads.

After the air and excess lubricant leave the bearings and the lubrication passages and the pressure inside the universal-joint cross becomes equal to the outside pressure, the relief valve shut-off member closes onto its seat.

The relief valves of the universal joints known heretofore are composed of several parts which have to be made with great precision in order to keep the universal joint tightly sealed. However, due to unavoidable imperfections of workmanship, the desired tightness fails to be obtained, which has a detrimental effect on the life of the universal joint.

A further disadvantage lies in that the relief valves are secured in the universal joints by provision of threads in the cross central hole and on the valve body, which complicates the manufacture of the universal joints.

Also known are universal joints wherein the relief valve is essentially a spring-loaded piston made in the form of a cylindrical metal stem fitted in the universal-joint cross central hole and adapted to close the outlets from the lubrication passages provided in the cross trunnions, a lubrication fitting being installed in the other end of the cross central hole.

These universal joints, in addition to the drawbacks mentioned above, suffer from the disadvantage that the piston and other movable parts of the relief valve are subject to wear which materially affects their life.

It is an object of the present invention to provide a universal joint the dependability and longevity of which will be improved by perfectly sealing its lubrication passages.

It is a further object of the present invention to simplify the construction of the universal-joint relief valve for ease of manufacture and assembly.

It is a still further object of the present invention to provide a universal joint wherein the supply of lubricant in the trunnion passages and bearings can be checked visually without taking the universal joint apart.

With these and various other objects in view, there is provided a universal joint having a cross, the trunnions of which are provided with through axial lubrication passages communicating with a hole formed centrally in said cross and located square to said axial passages in the trunnions, said central hole accommodating a relief valve which is made in the form of a cylindrical stem fitted in said central hole coaxially therewith and adapted to close the outlets from said axial passages.

According to the invention, the cylindrical stem is made of a resilient oil-resistant material and is fixed axially by making it an interference fit in the central hole provided in the universal-joint cross.

This permits of sealing off the lubrication passages in the universal-joint cross trunnions and at the same time renders the construction of the relief valve extremely simple. The stem can be made of any suitable resilient material, for example oil-resistant rubber, urethane or plastic.

It is desirable that the stem be axially hollowed for increased transverse resilience. Such a sleeve construction will enable nylon and other materials of lesser resilience than rubber to be used for the production of the relief valve.

Now the invention will be described in detail with reference to the accompanying drawings in which.

Figure 2:
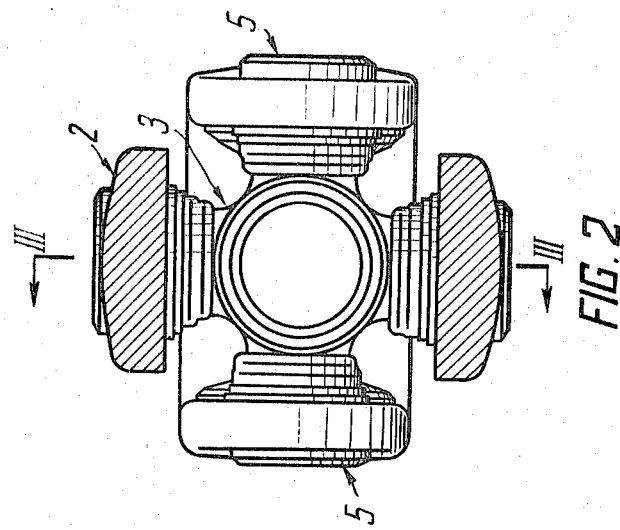
FIG. 2 is a section on the line II—II of FIG. 1.
Figure 1:
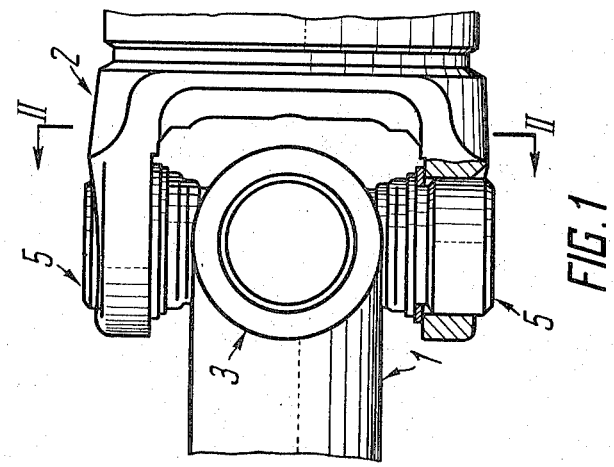
FIG. 1 is a partially sectionalized side view of an automobile universal joint.
Figure 3:
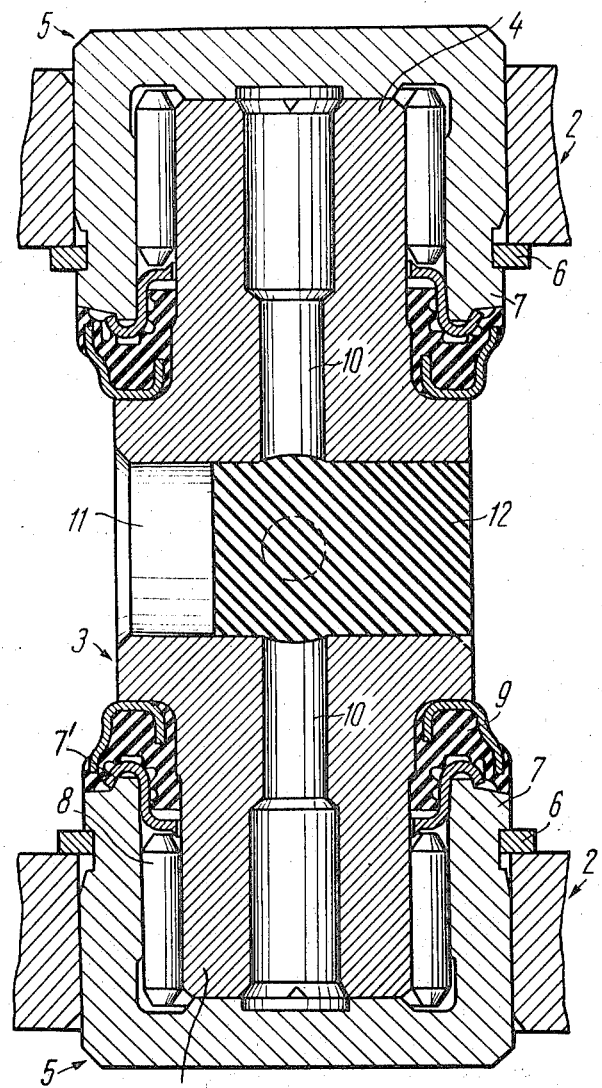
FIG. 3 is a section on the line III—III of FIG. 2 (the first embodiment, wherein a solid stem is used).

An automobile universal joint comprises two forks 1 and 2 (FIGS. 1 and 2), a cross 3 with trunnions 4 (FIGS. 3 and 4), and needle roller bearings 5.

Coaxial holes provided in the jaws of the forks 1 and 2 are fitted on the diametrically opposite trunnions 4 of the cross 3.

To enable the forks to turn round the trunnions 4 through a designed angle, a needle roller bearing race 7 is installed in each of the coaxial holes p;rovided in the jaws of the forks 1 and 2. Each race 7 is secured by a retainer ring 6 and accomodates needle rollers 8 which roll on the outside surface of the trunnion 4 and on the inside surface of the race 7.

Fitted at the inward end of the race 7 is a retainer 7' to prevent the needle rollers 8 from dropping out. Next to the retainer 7' is fitted a sealing ring 9 to exclude dirt and prevent lubricant escaping from the bearing.

Each trunnion 4 is provided with a through axial lubrication passage 10 which communicates with the runs square to a through hole 11 formed centrally in the cross 3.

The hole 11 accomodates a relief valve 12 adapted to close the outlets from the axial passages 10.

The relief valve 12 is essentially a cylindrical stem made of oil-resistant rubber, urethane or plastic. This stem is fixed axially by making it an interference fit in the hole 11.

Figure 4:
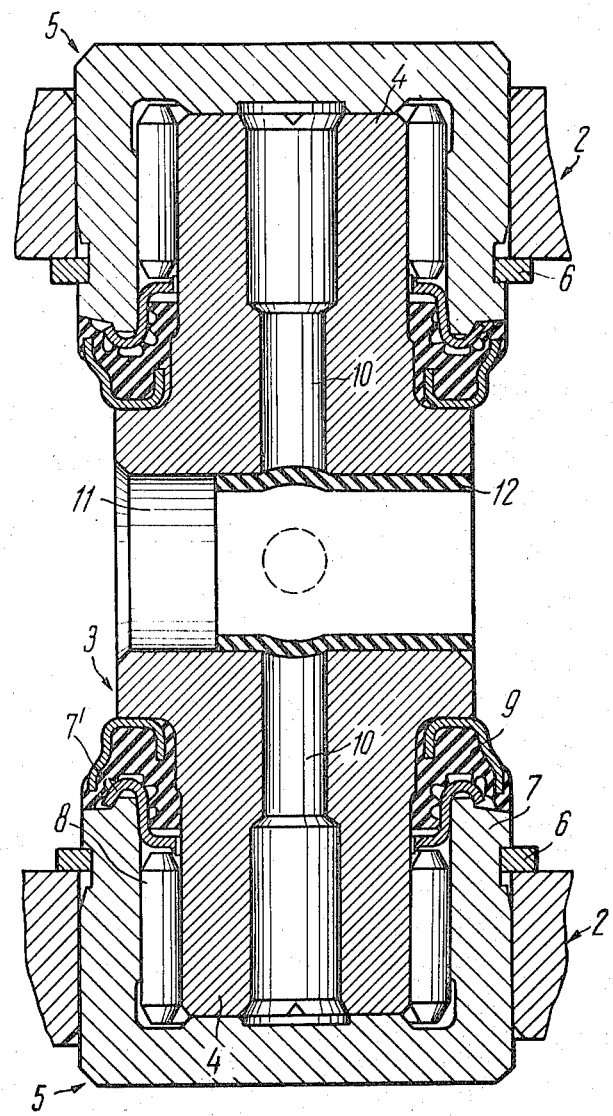
FIG. 4 is a section on the line III—III of FIG. 2 (the second embodiment, wherein a sleeve is used).

FIG. 4 shows the second embodiment of the invention, wherein the stem which constitutes the relief valve 12 is provided with an axial hollow 13. This sleeve construction enables nylon, plastics and other materials of lesser resilience than rubber to be used for the production of the relief valve.

The relief valve 12 operates as follows:

When assembling the universal joint, the opposite trunnions 4 (with the sealing rings 9 already fitted thereon) are inserted one at a time into the holes in the forks 1 and 2. Thereafter, with the races 7 fully or partially filled with lubricant, the bearings 5 are installed on the trunnions 4.

After the race 7 comes up against the sealing ring 9 during the installation of the bearing 5, the air and excess lubricant are forced from the race 7 into the axial passage 10 in the trunnion 4.

The pressure built up in the passage 10 acts on the stem (or sleeve) which constitutes the relief valve 12 and forces it off the outlet from the passage 10, whereby the air and excess lubricant are enabled to escape.

After the pressure inside the bearing 5 and in the passage 10 has dropped to that of the atmosphere, the stem (or sleeve) regains its initial shape by resilience and tightly fits against the wall of the central hole 11, securely sealing off the axial passages 10 in the trunnions 4.

The stem (or sleeve) is fixed axially in the central hole 11 by bulging into the outlets from the passages 10.

The build-up of pressure due to the air and excess lubricant being forced out of one of the passage 10 during the assembly of the universal joint bulges the stem (or sleeve) still further into the outlets from the three other passages 10, thereby rendering the fixing more secure.

In addition, by closing the outlets from the passages 10, the relief valve 12 insulates the passages 10 from one another. This enables the universal joint to run on a lesser amount of lubricant and also makes it possible to visually check the supply of lubricant in each bearing 5 with the universal joint assembled.

As compared with the universal joints equipped with relief valves known hitherto, the universal joint equipped with the relief valve constructed, as described herein, in the form of a stem or a sleeve made of a resilient material offers advantages in efficient working-out of the air and excess lubricant from the trunnion passages and the bearings, in positive sealing and in ease of manufacture and assembly.

What is claimed is:

1. A universal joint comprising: two forks with coaxial holes provided in their jaws; a cross with trunnions fitted into the holes in said forks, said cross having a hole formed centrally therein and square to the axes of said trunnions; bearings mounted one on each of said trunnions and secured in said fork holes; through axial passages provided in said trunnions and communicating with said cross central hole; a relief valve fitted in said cross central hole and adapted to close the outlets from said axial passages in the trunnions, which relief valve is essentially a stem made of a resilient oil-resistant material and fixed axially by making it an interference fit in said cross central hole.

2. A universal joint as claimed in claim 1, wherein the stem which constitutes the relief valve is made axially hollow for increased resilience.

\* \* \* \* \*